Oct. 29, 1929.  L. SAIVES  1,733,240
AUTOMATIC TAKING-UP OF PLAY
Filed Feb. 29, 1928  2 Sheets-Sheet 1
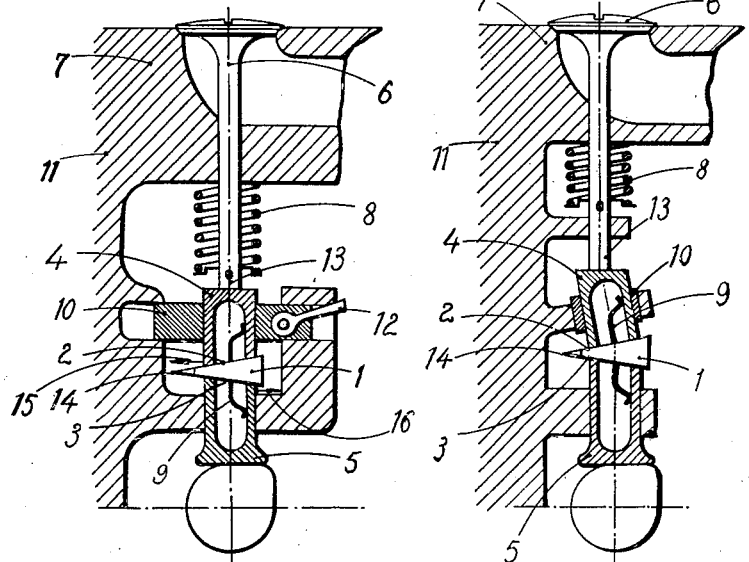
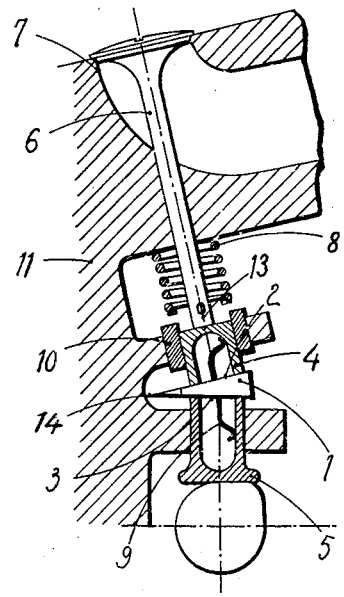
INVENTOR
LÉON SAIVES
By
Neill & Bunn
ATTORNEYS.

Oct. 29, 1929.     L. SAIVES     1,733,240
AUTOMATIC TAKING-UP OF PLAY
Filed Feb. 29, 1928     2 Sheets-Sheet 2
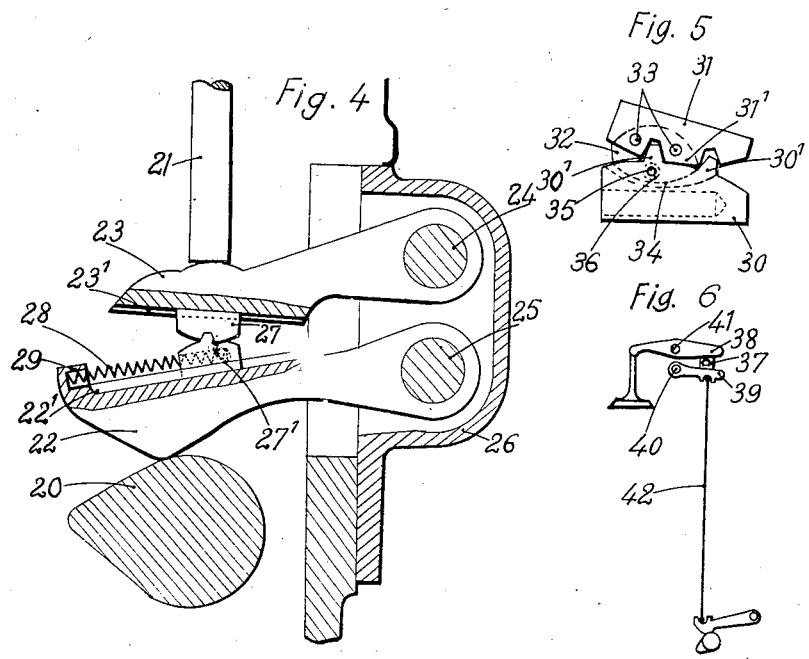
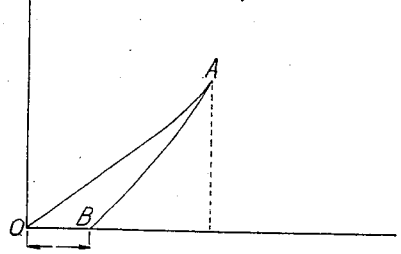
INVENTOR
LEON SAIVES.
By O'Neill & Bunn
ATTORNEYS.

Patented Oct. 29, 1929

1,733,240

UNITED STATES PATENT OFFICE

LÉON SAIVES, OF BILLANCOURT, FRANCE, ASSIGNOR TO LOUIS RENAULT, OF BILLANCOURT, FRANCE

AUTOMATIC TAKING-UP OF PLAY

Application filed February 29, 1928, Serial No. 258,032, and in France March 16, 1927.

My present invention relates to a mechanism which is applicable more particularly to the valves of internal combustion engines for automatically and continuously taking up play or wear, with the double object of reducing shocks, so as to make the valve gear absolutely silent and to save the members, and of obviating the necessity for adjustment by hand.

The invention has for its object to provide a mechanism consisting in an intermediate thrust member located between the operative thrust member and the valve or other actuated member, and a wedge interposed between the two thrust members and urged by a spring, so as to wedge the members one against the other. In order to release the wedge, the face of the intermediate thrust member, which is in contact with the wedge, is displaced laterally from time to time by the guide of the intermediate thrust member, either by the guide being made movable and being moved by a special mechanism, or if the guide is fixed, by its axis being inclined with respect to that of the operative thrust member.

In a modification of my invention, the operative thrust member and the intermediate thrust member consist in two pivoted levers, whereof one is actuated by the controlling cam and the other adapted to push the valve (or like controlled part). Between the two levers is slidable a wedge consisting of one or more pivoted members. The said pivoted levers have a parallel position, and their faces, upon which the wedge is slidable, form a certain angle with one another whose vertex is situated adjacent the axles of the levers. From this arrangement it will result that when the set of two levers operates in either direction, the relative motion of the levers will tend to slide the wedge, so that the latter will be released. A spring mounted upon one of the levers urges the wedge in the direction for taking up the wear, i. e., it urges the pointed or small end of the wedge in the direction of the axles of the said levers.

Herein the motion of the valve device will tend to drive the wedge, or on its small end, thus reducing the angle between the two levers, so that the stroke of the valve (or other controlled part) will be diminished.

In the accompanying drawing:—

Fig. 1 shows, solely by way of example, a construction according to the invention, wherein the guide of the intermediate thrust member is movable.

Fig. 2 shows a modification, wherein the guide of the intermediate thrust member is fixed, but inclined with respect to the operative thrust member.

Fig. 3 shows another modification according to the invention wherein both the valve and the intermediate thrust member have their axes inclined with respect to the axis of the operative thrust member.

Fig. 4 shows a further modification of the mechanism embodying my invention and employed with the usual valve gear.

Fig. 5 shows a detail view of the wedge.

Fig. 6 shows the use of the mechanism with valve gear control employing rocking levers.

Fig. 7 is a diagram which explains the functioning of the mechanism.

The apparatus shown in Fig. 1 comprises an irreversible wedge 1 with faces 2 and 3, and a thrust member 4 bevelled off below and interposed between the operative thrust mtmber 5 and the valve 6, which is held on its seat 7 by the spring 8, a spring 9 tending to thrust in the wedge, and a guide 10 for the intermediate thrust member having generatrices parallel to the axes of the valve and of the operative thrust member.

This guide 10 can be displaced with respect to the frame 11, subsequently returning to the original position, either whilst the valve is resting on its seat, or during its movement by means of the mechanism hereinafter described and constituted for example by a connecting rod 12 actuated by any mechanical movement.

In order to withdraw the tail 13 of the valve from the action of the thrust member 4, when it is displaced laterally, it may either be guided by means of a ring on the frame, or there may be interposed between it and the thrust member 4 a third thrust member held by a guide having the same axis as the valve, The force transmitted from one thrust member to the other by the wedge, would tend to move it out; owing to friction however the wedge remains in position and is irreversible.

If now the guide 10 constrains the thrust members 4 and 5 to be displaced laterally with respect to each other this sliding will take place on only one of the two faces 2 or 3 of the wedge, Fig. 1, for these faces do not act in the same way, one of the thrust members tending to be displaced with respect to the other from the side where is the apex 14 of the wedge (direction of the arrow 15) and the other from the opposite side (direction of the arrow 16).

It will be seen that if the coefficients of friction at the two contact surfaces 2 and 3 be approximately the same and if the angle of the wedge be sufficiently great with respect to possible variations of the coefficients of friction, and if the spring 9 be sufficiently weak as compared with the spring 8, the sliding will occur solely between the wedge and that thrust member, which tends to approach its apex 14.

Thus if the movement is both to and fro, the two thrust members approach the apex 14 one after the other, or in other words, the wedge is forced out by a well-determined length, which depends upon the angles chosen and the displacement of the members.

For example, if, while the valve is upon its seat, the guide 10 be displaced in the direction of the arrow 15, sliding will occur on the face 2 between the wedge and the thrust member 4; for in the relative movement of the two thrust members, it is the thrust member 4 which is displaced towards the apex 14. Similarly on the return movement in the direction of the arrow 16, sliding occurs on the face 3. It is thus seen that the wedge withdraws automatically.

Thus if any play arises, the wedge takes it up immediately owing to the action of the spring 9. If on the contrary, the valve no longer reaches its seat, at each to and fro movement of the guide 10, the wedge is withdrawn and by degrees the valve approaches its seat; when it reaches it, after each retreat the wedge regains the amount of play, which is permitted to it.

Instead of being produced successively in the direction of the arrows 15 and 16, the movement of the guide 10 may be reversed (16—15). It may even take place in any direction whatever, for example at right angles to the plane of Fig. 2, for as soon as sliding is caused, a non-reversible wedge behaves as though it were reversible.

The movement of the guide 10 can be produced in different ways, by the operation of connecting rods or levers themselves operated either by the engine by means of gear wheels, cranks, eccentrics or any equivalent means, or by an independent source of motion.

In the case in which the lateral to and fro displacement of the guide 10 is caused by the engine, it can be obtained by the operation of the thrust member of another valve, for example the thrust member of the other valve of the same cylinder, by means of heels, slopes or other equivalent means.

This displacement may be caused even by the movement of the lift of the valve. For this purpose the guide may rest upon fixed slopes, which, on the rising and falling of the valve, impart to it the desired to and fro movement.

In this latter case a point particularly covered by the invention consists in obtaining the lateral displacement of the face of the thrust member 4, which is in contact with the face 2 of the wedge, by fixing the guide 10 to the frame 11 and by inclining its axis, Fig. 2.

Finally in the construction more particularly the subject of the invention and shown in Fig. 3 the axis of the valve and that of the thrust member 4 are parallel or coincident, the thrust members 4 and 5 being cut off square or bevelled.

Another construction constituting a modification of that shown in Fig. 1 consists in replacing the slide planes 2 and 3 of different inclinations, by helical surfaces having different pitches.

The wedge is then replaced by a member provided with threads, tappings, helical slopes or spurs, the bevels on the thrust members being replaced respectively by tappings, threads, spurs or helical slopes. A torsion spring tends to lock the members, owing to the difference of the helical pitch, by rotating in the desired direction the member which replaces the wedge. The lateral to and fro movement of the intermediate thrust piece is replaced by a movement of rotation first in one direction and then in the other.

The operation is the same. The play is automatically taken up, and on the other hand during the alternate rotary movement of the intermediate thrust member, the helical bearing surfaces, non-reversible at rest, are enabled as though they became reversible, by the fact that sliding is obligatory, to select alternately from the two helical contacts, at which sliding can occur, that one which allows of unwedging.

An apparatus analogous to that of Fig. 2 can be made without departing from the scope of the invention by replacing the inclined intermediate thrust member in a fixed guide by a straight thrust member operated by a helical slope, so that on rising it is constrained to rotate.

To the particular case in which one of the faces of the wedge is perpendicular to a thrust member, there corresponds the case in which one of the helical screws or slopes is reduced to the limiting shape of a circular bearing surface allowing of rotation only.

Referring now to Fig. 4, I dispose, between the controlling cam 20 and the valve stem 21, two pivoted levers 22 and 23, which are disposed, as indicated in the figure, on the parallel axles 24 and 25 which are mounted on the main frame 26. The upper face 22' of the lower lever 22 and the lower face 23' of the upper lever 23 form guides coacting with the wedge 27. The faces 22' and 23' form between them an acute angle, whose vertex is adjacent the axles 24 and 25, and the wedge 27, whose vertex is also placed on this side, is urged, in the direction for taking up the wear, by the spring 28 which abuts against the end of a recess 29 formed in the face 22, and also against the end of a recess 27' formed in the wedge 27. The parts of the levers 22 and 23 which are respectively in contact with the cam 20 and the valve stem 21, have suitably chosen curvatures.

The disposition adopted for the faces 22' and 23' will tend—when the double lever device operates—to slide the wedge to the left, against the action of the spring 28, thus decreasing the stroke of the valve. This operation is clearly shown in the diagram, Fig. 7, in which the ordinates represent the angles of oscillation of the lever 23, and the abscissae the angles of oscillation of the lever 22. The resulting curve consists of a part O—A corresponding to the ascent of the system (the point A corresponding to the raised position of the valve) and of a part A—B corresponding to the descent of the system. When the operating cycle of the valve (rise and descent) is terminated, the lever 22 is still raised by a certain angle O—B relatively to its starting position, so that the movement of the system is thus represented by a sliding of the wedge 27 to the left, whereby the levers 22 and 23 are brought together. This result is essential in order that the valve will fit properly on its seat.

To allow the valve to come into position without shocks, it is necessary to use, for the outline of the cam, the diagram of the spacing to be obtained, as well as the present diagram showing the relative motion of the two levers.

As concerns the wedge, I may use to advantage the form of construction shown in Fig. 5, in which the pivotally mounted wedge consists of two shoes or blocks 30 and 31, for instance of bronze, which are connected together by one or two gear teeth 30', 31', this being sufficient to assure the necessary relative pivotation. The shoe 30 carries—engaged in a slot—a plate 32 which is riveted at 33; said plate engages with play in a slot 34 in the shoe 31 and is pivoted on an axle 35 of the shoe 31 which is inserted, with a suitable play, into a hole 36 in said plate. The axle 35 serves simply to connect together the shoes 30 and 31, so as to prevent their separation when the apparatus is taken apart.

I may further employ a like disposition to secure the entire wedge device to one of the pivoted levers, obviously providing the necessary degree of freedom.

The said mechanism is applicable to all valve arrangements. Fig. 6 shows an example of the device mounted upon valve gear control employing tappets or rockers. The wedge 37 is placed between an arm 38 of said rocker and the pivoted lever 39, whose axle 40 is parallel with the axle 41 of the said rocker and on the same vertical line, said lever being controlled by the rod 42. This is advantageous inasmuch as the wedge device is placed on the cylinder head, so that it is readily accessible.

As observed, my said mechanism according to the invention allows of actuating the valve rod without play, and the valve will also drop without shocks, thus affording a very noiseless device.

Claims:

1. A mechanism for automatically taking up wear in the valve of internal combustion engines, comprising an operative thrust member, an intermediate thrust member provided between the operative member and the tail of the valve to be operated, means for periodically imparting to the intermediate thrust member a lateral reciprocating motion, a wedge interposed between the two thrust members, and a spring soliciting the wedge to take up wear in the valve to be operated, the said wedge being periodically unwedged by the motion imparted to the intermediate thrust member.

2. A mechanism as claimed in claim 1, comprising an operative thrust member, an intermediate thrust member provided between the operative member and the tail of the valve to be operated, means whereby the lift and fall of the valve imparts to the intermediate thrust member a lateral reciprocating motion, a wedge interposed between the two thrust members, and a spring soliciting the wedge to take up wear in the valve to be operated, the said wedge being periodically unwedged by the motion imparted to the intermediate thrust member.

3. A mechanism as claimed in claim 1, comprising an operative thrust member, an intermediate thrust member provided between the operative member and the tail of the valve to be operated, a stationary guide for the intermediate thrust member, the axis of the said guide being inclined with respect to the axis of the operative thrust member, a wedge interposed between the two thrust members, and a spring soliciting the wedge to take up wear in the valve to be operated, the said wedge being periodically unwedged by the motion imparted through the said guide to the intermediate thrust member.

4. A mechanism as claimed in claim 1, comprising an operative thrust member, an intermediate thrust member provided between the operative member and the tail of the valve to be operated, the axis of the said valve and of the said intermediate member being parallel and inclined with respect to the axis of the said operative member, a stationary guide for the intermediate thrust member, a wedge interposed between the two thrust members, and a spring soliciting the wedge to take up wear in the valve to be operated.

In testimony whereof I affix my signature.

LÉON SAIVES.